(12) United States Patent
Richter et al.

(10) Patent No.: US 8,097,691 B2
(45) Date of Patent: Jan. 17, 2012

(54) PREPARATION OF POLYISOCYANATES OF THE TRIMER TYPE

(75) Inventors: Frank Richter, Leverkusen (DE); Reinhard Halpaap, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 195 days.

(21) Appl. No.: 12/402,855

(22) Filed: Mar. 12, 2009

(65) Prior Publication Data

US 2009/0234091 A1    Sep. 17, 2009

(30) Foreign Application Priority Data

Mar. 14, 2008  (EP) .................................... 08004769

(51) Int. Cl.
*C08G 18/16*  (2006.01)
(52) U.S. Cl. ......................................................... 528/51
(58) Field of Classification Search ........................ None
See application file for complete search history.

(56) References Cited

U.S. PATENT DOCUMENTS

| | | | |
|---|---|---|---|
| 2,671,082 A | | 3/1954 | Stallmann |
| 2,853,473 A | | 9/1958 | Campbell et al. |
| 2,853,518 A | * | 9/1958 | Balon ........................... 564/252 |
| 3,645,979 A | * | 2/1972 | Liebsch et al. ................... 528/51 |
| 4,614,785 A | * | 9/1986 | Richter et al. ................... 528/45 |
| 4,929,724 A | | 5/1990 | Engbert et al. |
| 5,914,383 A | | 6/1999 | Richter et al. |
| 6,444,778 B1 | | 9/2002 | Laas et al. |
| 7,067,654 B2 | | 6/2006 | Richter et al. |
| 7,151,151 B2 | | 12/2006 | Richter et al. |

FOREIGN PATENT DOCUMENTS

| | | |
|---|---|---|
| DE | 1670667 | 12/1970 |
| DE | 1670720 | 1/1971 |
| DE | 1934763 | 1/1971 |
| DE | 3437635 A1 | 4/1986 |
| DE | EP 0337116 * | 3/1989 |
| DE | 1174428 A2 | 1/2002 |
| DE | 10254878 A1 | 6/2004 |
| DE | 10354544 A1 | 6/2005 |
| EP | 0798299 A1 | 10/1997 |
| GB | 856372 | 12/1960 |
| GB | 1153815 | 5/1969 |
| GB | 1244416 | 9/1971 |
| WO | WO-00/52017 A1 | 9/2000 |

OTHER PUBLICATIONS

Rauhut et al., "The Free Radical Addition of Phosphines to Unsaturated Compounds", *J. Org. Chem.*, vol. 26, No. 12, pp. 5138-5145 (1961).

Hasserodt et al., "Phospholin-Derivate Ause Phosphor-Trihalogeniden Und Dienen", *Tetrahedron*, vol. 19, pp. 1563-1575 (1963).

Fritzsche et al., "Darstellung Primärer und Sekundärer Phosphine mit Silanen", *Chemische Berichte*, vol. 98, No. 5, pp. 1681-1687, (1965).

Rauhut et al., "The Free Radical Addition of Phosphines to Unsaturated Compounds", *J. Org. Chem.*, vol. 26, No. 12, pp. 5138-5145 (1961).

Hasserodt et al., "Phospholin-Derivate Ause Phosphor-Trihalogeniden und Dienen", *Tetrahedron*, vol. 19, pp. 1563-1575 (1963).

Fritzsche et al., "Darstellung Primärer und Sekundarer Phosphine mit Silanen", *Chemische Berichte*, vol. 98, No. 5, pp. 1681-1687, (1965).

Laas et al., "Zur Synthese Aliphatischer Polyisocyanate—Lackpolyisocyanate mit Biuret-, Isocyanurat- oder Uretdionstruktur", *J. Prakt. Chem.*, vol. 336, pp. 185-200 (1994).

* cited by examiner

*Primary Examiner* — Randy Gulakowski
*Assistant Examiner* — Jeffrey Washville
(74) *Attorney, Agent, or Firm* — Connolly Bove Lodge & Hutz LLP

(57) ABSTRACT

The invention relates to the use of heterocycles containing trivalent phosphorus as a ring member as catalysts for isocyanate modification and to a process for preparing polyisocyanates of the trimer type.

5 Claims, No Drawings

PREPARATION OF POLYISOCYANATES OF THE TRIMER TYPE

RELATED APPLICATIONS

This application claims benefit to European Patent Application No. 08004769.9, filed Mar. 14, 2008, which is incorporated herein by reference in its entirety for all useful purposes.

BACKGROUND OF THE INVENTION

The invention relates to the use of heterocycles containing trivalent phosphorus as a ring member as catalysts for isocyanate modification and to a process for preparing polyisocyanates of the trimer type.

Polyisocyanates are generally prepared by catalysed modification of monomeric isocyanate starting materials, frequently diisocyanates. In comparison with the former they are notable for qualities including a substantially lower vapour pressure and, consequently, better physiological tolerance. Where polyisocyanates having an NCO functionality of three or more are prepared from NCO-difunctional diisocyanates, these products additionally have the advantage of higher crosslinking density in polymers generated from them, coatings for example. Particularly advantageous in this context are isocyanate trimers of the isocyanurate type and iminooxadiazinedione type (referred to collectively here, for simplification, as trimer type). Relative to the isocyanurates with the same molecular weight distribution that are based on the same monomer, iminooxadiazinediones have the advantage of a significantly lower viscosity with the same high profile of properties (cf. EP-A 798 299).

All of the prior-art catalysts previously described for the preparation of the polyisocyanates of the trimer type are hampered by the disadvantage that, following the catalysed reaction, they cannot be recovered in undecomposed form, optionally together with the unreacted fraction of the diisocyanate for modification. In general, they remain, usually in deactivated form, in the process products and/or in the unreacted starting materials (monomer), which in general are circulated. Therein they may give cause for unwanted follow-on reactions such as colour deepening, NCO drifts, etc., or have other disadvantageous effects, such as increasing contamination of the monomer which is generally circulated, for example. A further factor is that the known trimerization catalysts of the prior art are active only at a relatively high temperature, and in many cases their action sets in only after a certain 'induction period', which is disruptive to the process. Quite apart from this, the industrial use of relatively high-priced catalysts is prohibited by economic considerations.

The recycling of the modification catalyst without conversion—optionally, intermediary conversion—into a different form has to date been accomplished only in the case of phosphines (phosphanes) and also special pyridines, more particularly 4-dialkylaminopyridines such as, for example, 4-dimethylaminopyridine (DMAP) (DE-A 10354544, DE-A 10254878 and also J. Prakt. Chem./Chem. Ztg. 1994, 336, 185-200). Phosphines and 4-dialkylaminopyridines, however, yield predominantly polyisocyanates containing uretdione groups, which therefore have a low average NCO functionality. As a sole building block for the preparation of highly branched polyurethane polymers, especially in the paints and coatings sector, their suitability is limited.

Although according to the teaching of DE-A 1 670 720 the use of phosphines for isocyanate modification at relatively high temperature and/or with a relatively high level of monomer conversion is said to be accompanied by the formation of increasing fractions of isocyanate trimers, the products of the process nevertheless at the same time include not inconsiderable fractions of other by-products such as carbodiimides and uretonimines. Uretonimines are especially disruptive, since in the course of storage they tend to release monomeric isocyanate and the products are in that case no longer physiologically unobjectionable. Additionally, in the case of phosphine-catalysed isocyanate modification with increased temperature and/or conversion, the uretdione fraction does not decrease to the extent that it would be truly possible, in reactions in the industrially practical temperature and conversion ranges, to talk of the primary formation of products of the trimer type (Comparative Examples 1 to 4).

Very generally, phosphine-catalysed isocyanate oligomerization takes a different course when operating in the presence of aromatic isocyanates (cf. inter alia GB 1 244 416, U.S. Pat. No. 3,645,979, GB 856 372, U.S. Pat. No. 2,671,082). In this case the isocyanate 'trimerization' (more particularly the formation of isocyanurate) occupies the foreground significantly (Comparative Example 5). Occasionally the aforementioned patents, as well as a reference to numerous other phosphines which are said to be suitable as catalysts, in long lists, also indicate that 1-butylphosphacyclopentane (1-butylphospholane) or 1-phenyl-3-methylphosphol-3-ene might be suitable for the polymerization of isocyanates. To what extent, then, isocyanurates or iminooxadiazinediones can deliberately be prepared from purely aliphatic isocyanates by means of such catalysts, the stated patents do not reveal. This is particularly doubtful on account of the fact that trialkylphosphines specified therein, in connection with aliphatic isocyanates, are known to be highly active catalysts for the formation of uretdione, and this is in fact demonstrated with an example in GB 1 244 416, whereas in mixtures of aliphatic and aromatic isocyanates they form mixed trimers containing only a small amount of iminooxadiazinedione. Furthermore, U.S. Pat. No. 2,671,082 explicitly describes phenyl-dimethylphosphine and phenyldi(n-butyl)phosphine as preferred catalysts, which, as our own studies demonstrate, have no catalytic activity towards aliphatic isocyanates (Comparative Example 6). The same applies to 1-phenyl-3-methylphosphol-3-ene (Comparative Example 7).

Furthermore, butylphosphacyclopentane (butylphospholane), as well as other trialkylphosphines, has also been described in EP-A 1 174 428 as an optionally suitable catalyst for the dimerization of isocyanates to uretdiones. The description there is of the suitability in principle of these substances for the said purpose, the document teaching their use in combination with specific ureas or amides. There are no references in EP-A 1 174 428 to a difference in reactivity of butylphospholane to typical trialkylphosphines such as tri-n-butylphosphine. As is apparent from Comparative Examples 8 and 9, the sterically hindered phosphines tri(tert-butyl)phosphine and tri(isopropyl)phosphine, which are likewise said optionally to be suitable in EP-A 1 174 428, have no catalytic activity.

From U.S. Pat. No. 2,853,473 it is known that phospholane P-oxides can be used for the formation of carbodiimide from isocyanates. According to U.S. Pat. No. 2,853,518, the oxygen-free pendants of these P-oxides, containing trivalent phosphorus, are also said to be suitable for this purpose. The reactions described in U.S. Pat. No. 2,853,518 take place at an elevated temperature, generally without further protective measures such as an inert gas atmosphere, with generally high catalyst concentrations and also long reaction times, with direct observation of the evolution of gaseous $CO_2$, which is characteristic of the formation of carbodiimide. Owing to the known oxidation tendency of compounds containing trivalent phosphorus, and to the absence of protective measures to ensure that in the reaction it is in fact phospholanes and not their P-oxidized analogues or other conceivable oxidation products that are present, however, it appears extremely questionable whether what was observed in the examples of U.S. Pat. No. 2,853,518 was actually the catalytic effect of phospholanes.

It has now surprisingly been found that when it has been ensured, through the presence of an inert gas atmosphere, for example, that only trivalent phosphorus is present, phospholanes and other phosphine derivatives in which the trivalent phosphorus, via two of its single bonds, is part of an organic ring system, catalyse the targeted formation of isocyanurates and iminooxadiazinediones from aliphatic and/or cycloaliphatic isocyanates, giving products which are low in uretdiones and substantially free from carbodiimides and uretonimines. Furthermore, over the whole of the target reaction range, even at low reaction temperatures, the reaction proceeds very uniformly, without an induction period and without a significant drop in activity during the catalysed reaction, and with a comparatively high fraction of iminooxadiazinedione groups in the product. Following the reaction the catalysts can be recovered, together for example with the monomer under modification, and subsequently used again.

EMBODIMENTS OF THE INVENTION

An embodiment of the present invention is a process for preparing polyisocyanates from aliphatic and/or cycloaliphatic isocyanates, wherein the fraction of isocyanurate structures and iminooxadiazinedione structures in the polyisocyanate formed is more than 60 mol %, preferably more than 70 mol %, especially more than 75 mol %, the fraction of uretdione structures is less than 25 mol %, preferably less than 20 mol %, and the fraction of carbodiimide structures and uretonimine structures is less than 5 mol %, based on the sum of all the types of structure formed, comprising reacting at least one aliphatic and/or cycloaliphatic isocyanate in the presence of a heterocyclic catalyst of formula (I)

(I)

wherein
R$^1$ is a non-cyclic or cyclic aliphatic C$_1$-C$_{50}$ radical which is optionally mono- or polyunsaturated and/or mono- or poly-C$_1$-C$_{20}$ alkyl- or alkoxy-substituted; and
R$^2$ and R$^3$
together with the phosphorus atom, and optionally with R$^1$, define a cycloaliphatic C$_2$-C$_{20}$ radical which is optionally mono- or poly-C$_5$-C$_{20}$ alkyl- or alkoxy-substituted, polycyclic and/or mono- or polyunsaturated.

Yet another embodiment of the present invention is the above process, wherein in formula (I)
R$^1$ is a non-cyclic or cyclic, aliphatic C$_1$-C$_{12}$ radical which is optionally mono- or poly-C$_1$-C$_8$ alkyl- or alkoxy-substituted; and R$^2$ and R$^3$
together with the phosphorus atom define a saturated cycloaliphatic C$_4$-C$_6$ radical which is optionally mono- or poly-C$_1$-C$_{20}$ alkyl- or alkoxy-substituted and/or bicyclic.

Yet another embodiment of the present invention is the above process, wherein said catalyst of formula (I) is selected from the group consisting of 1-methyl-1-phospholane, 1-ethyl-1-phospholane, 1-propyl-1-phospholane, 1-butyl-1-phospholane, 1-pentyl-1-phospholane, 1-hexyl-1-phospholane, 1-octyl-1-phospholane, 9-methyl-9-phosphabicyclononane, 9-ethyl-9-phosphabicyclononane, 9-propyl-9-phosphabicyclononane, 9-butyl-9-phosphabicyclononane, 9-pentyl-9-phosphabicyclononane, 9-hexyl-9-phosphabicyclononane, 9-octyl-9-phosphabicyclononane, 9-dodecyl-9-phosphabicyclononane, 9-eicosyl-9-phosphabicyclononane, or mixtures thereof.

Yet another embodiment of the present invention is the above process, wherein said at least one aliphatic and/or cycloaliphatic isocyanate is reacted in the presence of a heterocyclic catalyst of formula (I) at a temperature in the range of from 0 to 150° C.

Yet another embodiment of the present invention is the above process, wherein said at least one aliphatic and/or cycloaliphatic isocyanate is reacted in the presence of a heterocyclic catalyst of formula (I) under an inert gas atmosphere.

DESCRIPTION OF THE INVENTION

The invention provides a process for preparing polyisocyanates from aliphatic and/or cycloaliphatic isocyanates, with a fraction of isocyanurate structures and iminooxadiazinedione structures in the polyisocyanate formed of more than 60 mol %, preferably more than 70 mol %, especially more than 75 mol % and a fraction of uretdione structures of less than 25 mol % preferably and a fraction of carbodiimide structures and uretonimine structures below 5 mol %, based on the sum of all the types of structure formed from the previously free isocyanate groups, wherein use is made as catalysts of heterocycles of the formula (I)

formula (I)

where
R$^1$ is a non-cyclic or cyclic, aliphatic C$_1$-C$_{50}$ radical which may be mono- or polyunsaturated and/or mono- or poly-C$_1$-C$_{20}$ alkyl- or alkoxy-substituted and
R$^2$ and R$^3$, with one another and with the phosphorus atom and also, where appropriate, with R$^1$, form a cycloaliphatic C$_2$-C$_{20}$ radical which may be mono- or poly-C$_1$-C$_{20}$ alkyl or alkoxy-substituted, polycyclic and/or mono- or polyunsaturated.

Preference is given to compounds of the formula (I) in which
R$^1$ is a non-cyclic or cyclic, aliphatic C$_1$-C$_{50}$ radical which may be mono- or polyunsaturated and/or mono- or poly-C$_1$-C$_8$ alkyl- or alkoxy-substituted and
R$^2$ and R$^3$, with one another and with the phosphorus atom, form a cycloaliphatic C$_2$-C$_{20}$ radical which may be mono- or poly-C$_1$-C$_{20}$ alkyl- or alkoxy-substituted and/or bicyclic.

Particular preference is given to compounds of the formula (I) in which $R^1$ is a non-cyclic or cyclic, aliphatic $C_1$-$C_{12}$ radical which may be mono- or poly-$C_1$-$C_8$ alkyl- or alkoxy-substituted and $R^2$ and $R^3$, with one another and with the phosphorus atom, form a saturated cycloaliphatic $C_4$-$C_6$ radical which may be mono- or poly-$C_1$-$C_{20}$ alkyl or alkoxy-substituted and/or bicyclic.

Examples of heterocycles of the formula (I) for use in accordance with the invention are 1-methyl-1-phospholane, 1-ethyl-1-phospholane, 1-propyl*-1-phospholane, 1-butyl*-1-phospholane, 1-pentyl*-1-phospholane, 1-hexyl*-1-phospholane, 1-octyl*-1-phospholane, 9-methyl-9-phosphabicyclononane, 9-ethyl-9-phosphabicyclononane, 9-propyl*-9-phosphabicyclononane**, 9-butyl*-9-phosphabicyclononane**, 9-pentyl*-9-phosphabicyclononane**, 9-hexyl*-9-phosphabicyclononane**, 9-octyl*-9-phosphabicyclononane**, 9-dodecyl*-9-phosphabicyclononane**, 9-eicosyl*-9-phosphabicyclononane** in pure form or as any desired mixtures with one another.

*Propyl-, butyl-, pentyl- etc. stands in each case for all isomeric $C_3$, $C_4$, $C_5$ etc. radicals, incl. the carbocycles, **9-phosphabicyclononane, trivial name: phobane, includes in particular the two isomers 9-phosphabicyclo[3.3.1]nonane and 9-phosphabicyclo[4.2.1]nonane, which are obtained typically as a mixture in the synthesis.

All of the aforementioned catalysts can be used individually, in any desired mixtures with one another or in mixtures with other primary, secondary and/or tertiary alkyl-aralkyl- and/or arylphosphines and also 4-dialkylaminopyridines.

The process of the invention is preferably conducted by reacting at least one organic isocyanate with at least one compound of formula (I), optionally solvents and optionally additives and conducting the reaction such that the conversion of the free NCO groups to the polyisocyanate of the trimer type is 1% to 100%, preferably 5% to 80%.

The amount of catalyst to be used in the process of the invention is guided primarily by the target reaction rate for a given reaction temperature and is situated in the range from 0.001 to 5 mol %, based on the sum of the molar amount of the (di)isocyanate(s) to be reacted and of the catalyst. It is preferred to use 0.01 to 3 mol % of catalyst, more particularly 0.01 to 1 mol %.

In the process of the invention the catalyst b) can be used undiluted or in solution in solvents. Suitable solvents in this context include all compounds which under the reaction conditions do not react with phosphines, such as, for example, unhalogenated or halogenated (F, Cl, not Br, I), aliphatic or aromatic hydrocarbons, alcohols, ketones, esters and ethers.

With the catalysts essential to the invention it is possible in principle to carry out trimerization of all known organic isocyanates, prepared by phosgenation or by phosgene-free processes and containing aliphatically and/or cycloaliphatically attached isocyanate groups, individually or in any desired mixtures with one another.

It is preferred to use aliphatic, cycloaliphatic or araliphatic di- or polyisocyanates with an NCO functionality $\geq 2$.

Mention may be made, by way of example, of pentane diisocyanates, hexane diisocyanates, heptane diisocyanates, octane diisocyanates, nonane diisocyanates, decanediisocyanates, undecane diisocyanates, dodecane diisocyanates and tridecane diisocyanates, and any desired isomers of the aforementioned compounds, including the carbocycles, pure or in any desired blend with one another, may be employed.

Use is made more particularly of hexamethylene diisocyanate (HDI), methylpentane diisocyanate (MPDI), trimethylhexane diisocyanate (TMDI), bis(isocyanatomethyl)cyclohexane ($H_6$XDI), norbornane diisocyanate (NBDI), isophorone diisocyanate (IPDI), bis(isocyanatocyclohexyl)methane ($H_{12}$MDI), individually or in any desired mixtures with one another.

The process of the invention is carried out in the temperature range 0° C. to 150° C., preferably 0° C. to 100° C., more preferably 20° C. to 80° C.

The process of the invention is preferably carried out in the presence of inert gases. The oxygen fraction in the inert gas atmosphere under which the catalytic reaction is carried out is preferably less than 1% by volume, preferably less than 0.1% by volume.

Preferably, however, the reaction of the NCO groups is not taken to a degree of 100%, but is instead discontinued earlier, and the reaction batch is worked up.

With full NCO conversion or at the time of discontinuation of the reaction, the reaction mixture contains more than 60 mol %, preferably more than 70 mol %, especially more than 75 mol % of trimer structures, based on the entirety of the types of structure which are formed from the NCO groups of the initial isocyanate (mixture) that are present in free form prior to the catalysed reaction.

With complete NCO conversion or at the time of discontinuation of the reaction, the reaction mixture contains preferably less than 25 mol %, more preferably less than 20 mol %, of uretdione structures and less than 5 mol %, more preferably less than 2 mol %, of carbodiimide structures and/or uretonimine structures, again based on the entirety of the types of structure resulting from the previously free NCO groups of the starting isocyanate (mixture).

Suitable in principle for the discontinuation of the reaction when the desired degree of conversion has been reached are all previously described catalyst poisons, even if this approach is not preferred (DE-A 1670667, 1670720, 1934763, 1954093, 3437635, U.S. Pat. No. 4,614,785), such as alkylating agents (e.g. dimethyl sulphate, methyl toluenesulphonate), organic or inorganic peroxides, acid chlorides, and also sulphur, which are reacted with the catalyst with, where appropriate, an increase in temperature. When the reaction mixture has been deactivated, unreacted monomer and/or the deactivated catalyst can be separated off (variant A).

Preferably, however, the process of the invention is carried out without chemical deactivation of the catalyst. For this purpose, when the desired conversion has been reached, the active catalyst is separated from the reaction mixture, in order to prevent further reaction with the possible formation of by-product. At the same time, or else after, the separation of the catalyst, unreacted monomer can be separated off. Preferably the unreacted monomer is separated off together with the catalyst from the product (variant B).

To separate off unreacted monomers, the catalyst and/or other unwanted constituents from the reaction mixture, it is possible in the process of the invention to use all known separation techniques, such as distillation, extraction or crystallization/filtration, for example. It is of course also possible to employ combinations of two or more of these techniques.

Where the polyisocyanate prepared in accordance with the invention is still to contain free, unreacted monomer, it is possible to forego the separation of monomer following discontinuation of the reaction.

For the implementation of the process of the invention it is immaterial whether the process is carried out wholly or partly batchwise or continuously.

In the case of the procedure without deactivation of catalyst, it is preferred to employ a reaction regime which is (semi) continuous at least in respect of the catalysed reaction, since in this way the catalyst is employed optimally in respect of space-time yield.

Furthermore, stabilizers and additives that are typical in polyisocyanate chemistry may be added at any desired point in time in the process of the invention. Examples are antioxidants, such as sterically hindered henols (2,6-di-tert-butylphenol, 4-methyl-2,6-di-tert-butylphenol), light stabilizers, such as HALS amines, triazoles, etc., weak acids or catalysts for the NCO—OH reaction, such as dibutyltin dilaurate (DBTL), for example.

Furthermore it may be sensible to add small amounts of a catalyst poison for use in variant A to a product worked up in accordance with variant B, in order to increase the stability with respect to back-conversion, to reduce the tendency towards formation of by-product and/or further reaction of the free NCO groups, and/or to reduce the yellowing tendency, particularly in the case of product storage.

Products prepared by the process of the invention and based on unbranched or branched, linearly aliphatic di- or polyisocyanates which contain no cycloalkyl substituents are light in colour and have a viscosity<2000 Pas/23° C. Where cycloaliphatic and/or aliphatic di- or polyisocyanates are used, the products are highly viscous or solid resins (viscosity>20 000 Pas/23° C.).

In low-monomer form, i.e. after separation of unreacted monomer, the products of the invention have an NCO content<27% by weight, preferably <25% by weight.

The polyisocyanates prepared by the process of the invention serve as starting materials for the production of, for example, mouldings (unfoamed or foamed), paints, coating materials, adhesives or adjuvants, it also being possible for the free NCO groups present to be blocked if appropriate.

Suitable methods for the blocking of the free NCO groups include all of those known to the skilled person. As blocking agents it is possible more particularly to use phenols (e.g. phenol, nonylphenol, cresol), oximes (e.g. butanone oxime, cyclohexanone oxime), lactams (e.g. ∈-caprolactam), secondary amines (e.g. diisopropylamine), pyrazoles (e.g. dimethylpyrazole), imidazoles, triazoles) or malonic and acetic esters.

The polyisocyanates of the trimer type that are prepared according to the process of the invention can be used more particularly for the preparation of one- and two-component polyurethane paints in a blend if appropriate with other prior-art di- or polyisocyanates, such as di- or polyisocyanates containing uretdione, biuret, urethane and/or allophanate groups.

For the reaction of the polyisocyanates prepared in accordance with the invention to give the polyurethane it is possible to use all compounds having at least two isocyanate-reactive functionalities, individually or in any desired mixtures with one another (isocyanate-reactive binder).

Preference is given to the use of one or more isocyanate-reactive binders which are known per se in polyurethane chemistry, such as polyhydroxy compounds or polyamines. Polyhydroxy compounds used are, with particular preference, polyester polyols, polyether polyols, polyacrylate polyols and/or polycarboxylic acid polyols, also where appropriate with the addition of polyhydric alcohols of low molecular mass.

The ratio of equivalents between free isocyanate groups, which where appropriate may also be blocked, and isocyanate-reactive functionality of the isocyanate-reactive binder, such as OH—, NH— or COOH, for example, is between 0.8 to 3, preferably 0.8 to 2.

For accelerating the crosslinking reaction of the polyisocyanates prepared in accordance with the invention with the isocyanate-reactive binder it is possible to use all of the catalysts that are known from polyurethane chemistry. For example it is possible to use metal salts such as dibutyl tin (IV) dilaurate, tin (II) bis(2-ethylhexanoate), bismuth (III) tris(2-ethylhexanoate), zinc (II) bis(2-ethylhexanoate) or zinc chloride and also tertiary amines such as 1,4-diazabicyclo[2.2.2]octane, triethylamine or benzyldimethylamine.

For formulation, the polyisocyanate of the trimer type prepared in accordance with the invention and blocked if appropriate, the isocyanate-reactive binder, catalyst(s) and, where appropriate, the typical additions such as pigments, fillers, additives, flow control assistants, defoamers and/or matting agents are mixed and homogenized on a typical mixing assembly such as, for example, a sand mill, where appropriate with use of solvents.

Suitable solvents are all typical paint solvents known per se, such as, for example, ethyl acetate and butyl acetate, ethylene or propylene glycol monomethyl, monoethyl or monopropyl ether acetate, 2-butanone, 4-methyl-2-pentanone, cyclohexanone, toluene, xylene, solvent naphtha, N-methylpyrrolidone, etc.

The coating materials may be applied in solution or from the melt and also, if appropriate, in solid form (powder coating materials) to the article that is to be coated, by the typical methods such as brushing, rolling, pouring, spraying, dipping, the fluid-bed sintering process, or electrostatic spraying processes, for example.

Suitable substrates are all known materials of construction, more particularly metals, wood, plastics and ceramic.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Unless noted otherwise, all percentages are to be understood as percent by weight (%) by weight.

The determination of the NCO content of the resins described in the examples is carried out by titration in accordance with DIN 53 185.

The dynamic viscosities were determined at 23° C. using the VT 550 viscometer from Haake, Karlsruhe. Measurements at different shear rates ensured that the rheology of the described polyisocyanates prepared in accordance with the invention corresponds to that of ideal Newtonian fluids. There is therefore no need to state the shear rate.

The indication 'mol %' and/or of the (molar) ratio of different types of structure to one another is based on NMR spectroscopy measurements. Unless indicated otherwise, it always refers to the sum of the types of structure formed by the modification reaction (oligomerization) from the previously free NCO groups of the isocyanate to be modified. The $^{13}$C NMR measurements were made on the Bruker instruments DPX 400, AVC 400 or DRX 700, on approximately 50% samples in dry $CDCl_3$ or approximately 80% samples in $D_6$-DMSO, with a proton frequency of 400 or 700 MHz ($^{13}$C NMR: 100 or 176 MHz, relaxation delay: 4 sec, 2000 scans). As a reference for the ppm scales, small amounts of tetramethylsilane in the solvent, with a $^{13}$C-chemical shift of 0 ppm, or the solvent itself, with a shift of 77.0 ppm (CDCl$_3$) or 43.5 ppm (D$_6$-DMSO), were chosen.

The catalysts and chemicals described in the inventive and comparative examples were obtained, unless noted otherwise, from the companies of Aldrich, 82018 Taufkirchen, DE or Bayer MaterialScience, 51368 Leverkusen, and, unless noted otherwise, were used without further purification.

Unless indicated otherwise, the reactions were carried out with freshly degassed HDI as a reactant. The designation 'freshly degassed' here means that the HDI employed was freed from dissolved gases immediately prior to the catalytic reaction, by stirring under reduced pressure (<1 mbar) for at least 30 minutes, and then blanketed with nitrogen.

All of the reactions were carried out under an atmosphere of dry nitrogen. The preparation of the catalysts, where they were not available commercially, took place in accordance with methods known from the literature: Chem. Ber. 98, 1681-1687 (1965) and Tetrahedron, 19, 1563-1575 (1963) and literature cited therein.

Eicosylphobane (9-n-eicosyl-9-phosphabicyclo[3.3.1]nonane/9-n-eicosyl-9-phosphabicyclo[4.2.1]nonane; isomer mixture) was obtained from Digital, P.O. Box 728 Lancaster, United Kingdom, LA1 5AW and used without purification. The other phobanes were prepared starting from the P—H-functional phobane (9-phosphabicyclo[3.3.1]nonane/9-phosphabicyclo[4.2.1]nonane; isomer mixture, from Digital) in a method based on J. Org. Chem. 26, 5138-5145 (1961) by free-radical addition of olefins to the PH function. With a similar yield and isomer composition, some of these compounds were also prepared by free-radical addition of RPH$_2$ to 1,5-cyclooctadiene (COD) in accordance with WO 00/52017. The RPH$_2$ derivatives used in this case were provided by Cytec Canada Inc., 9061 Garner Road, P.O. Box 240, Niagara Falls, Ontario, Canada L2E 6T4. An example is given below:

Preparation of 9-cyclopentyl-9-phosphabicyclo[3.3.1]nonane/9-cyclopentyl-9-phosphabicyclo[4.2.1]nonane; isomer mixture ('cyclopentylphobane')

A 25 ml stirred vessel was charged at room temperature under nitrogen with 2.0 g (18.5 mmol) of 1,5-cyclooctadiene (Aldrich, 82018 Taufkirchen, DE), 71 mg of azo-bis-isovaleronitrile (VAZO 67, Aldrich, 82018 Taufkirchen, DE) and 3.8 g of a 50% strength solution of monocyclopentylphosphine in toluene (Cytec). This initial charge was subsequently heated to a bath temperature of 80° C. with stirring. After 24 h it was cooled to room temperature, treated with a further 71 mg of AIBN and heated with stirring at a bath temperature of 80° C. for a further 24 h. Subsequently it was worked up by vacuum distillation, giving 2.3 g of cyclopentylphobane isomer mixture (60% of theory; b.p.: 95° C. at 0.05 mbar).

TABLE 1

Overview of the catalysts used in the examples

| No. | Structural formula | Trivial name |
|---|---|---|
| I | | Methylphospholane |
| II | | Butylphospholane |
| III | | Butylphobane, isomer mixture |
| IV | | Cyclopentylphobane, isomer mixture |
| V | | Eicosylphobane, isomer mixture |

Example 1

Catalyst: 1-methylpholane, I 20 g (0.12 mol) of freshly distilled HDI (Bayer Material Science, 51368 Leverkusen, DE) were stirred at 60° C. first under reduced pressure (0.1 mbar) in order to remove dissolved gases for 1 h, then blanketed with dry nitrogen and admixed at 30° C. with 0.16 g (1.5 mmol) of 1-methylphospholane. The rise in the refractive index, as a measure of the progressing reaction, was monitored (Table 2).

TABLE 2

| Reaction time hh:mm | $n_D^{20}$ |
|---|---|
| 00:00 | 1.4523 |
| 02:40 | 1.4576 |
| 04:35 | 1.4600 |
| 19:30 | 1.4777 |
| 43:00 | 1.4970 |

After 43 hours the reaction was "stopped" by addition of 55 mg (1.7 mmol) of elemental sulphur, and the virtually colourless product mixture obtained was then analysed; cf. Table 3.

TABLE 3

| Ex. | $n_D^{20}$ | Uretonimines [mol %] | Uretdiones [mol %] | Isocyanurates [mol %] | Iminooxadiazinediones [mol %] |
|---|---|---|---|---|---|
| 1 | 1.4970 | 0.5 | 9.5 | 62.8 | 27.2 |

Example 2

Catalyst: 1-butylphospholane, II

In a double-walled vessel with flat-ground joints, heated at 30° C. by means of an external circuit, having a stirrer, attached to an inert gas unit (nitrogen/vacuum), reflux condenser and thermometer, 600 ml of HDI were introduced and degassed. After nitrogen blanketing, 1.48 g (10 mmol) of catalyst II were added and the mixture was stirred at 30° C. for the time indicated in Tab. 4. In order to rule out contamination of the reaction mixture with atmospheric oxygen, no sampling was carried out, and distillative work-up took place after a reaction time of approximately 7 hours, without deactivation of the catalyst beforehand. Working up took place by a vacuum distillation in a thin-film evaporator, short-path evaporator (SPE) type, with upstream pre-evaporator (PE) (distillation data: pressure: 0.08 mbar, PE temperature: 120° C., ME temp.: 140° C., distillation time: approximately 1 h), with unreacted monomer being separated together with the active catalyst as a distillate and the low-monomer polyisocyanate resin being separated as a bottom product (starting run: example 2-0).

The distillate containing the active catalyst was collected in a second stirring apparatus with flat-ground joints, whose construction is identical to that of the first, and immediately after the end of distillation was made up with freshly degassed HDI to the initial quantity (600 ml). Subsequently, stirring was carried out again for the time indicated in Table 4, at 30° C., and the product was worked up by distillation as described above (example 2-A). This procedure was repeated a total of three times (to experiment 2-C).

TABLE 4

| Ex. 2- | Reaction time [hh:mm] | Resin yield [g] | NCO content [%] | Viscosity at 23° C. [mPas] | Uretonimines [mol %] | Uretdiones mol % | Isocyanurates [mol %] | Iminooxadiazindiones [mol %] |
|---|---|---|---|---|---|---|---|---|
| 0 | 7:00 | 110 | 23.4 | 850 | 0.8 | 13.2 | 54.1 | 31.9 |
| A | 15:45 | 104 | 23.3 | 870 | 1.0 | 14.4 | 53.2 | 31.4 |
| B | 7:30 | 106 | 23.3 | 860 | 1.1 | 12.5 | 56.2 | 30.2 |
| C | 15:15 | 102 | 23.5 | 810 | 1.4 | 13.6 | 52.8 | 32.2 |

Example 3

Catalyst: butylphobane, isomer mixture III

In a double-walled vessel with flat-ground joints, heated at 40° C. by means of an external circuit, having a stirrer, attached to an inert gas unit (nitrogen/vacuum), reflux condenser and thermometer, 500 ml of HDI were introduced and degassed. After nitrogen blanketing, 0.59 g (3 mmol) of catalyst III was added and the mixture was stirred at 40° C. for the time indicated in Tab. 5. In order to rule out contamination of the reaction mixture with atmospheric oxygen, no sampling was carried out, and distillative work-up took place after a reaction time of approximately 15 hours, without deactivation of the catalyst beforehand. Working up took place by a vacuum distillation in a thin-film evaporator, short-path evaporator (SPE) type, with upstream pre-evaporator (PE) (distillation data: pressure: 0.08 mbar, PE temperature: 140° C., ME temp.: 150° C., distillation time: approximately 1 h), with unreacted monomer being separated together with the active catalyst as a distillate and the low-monomer polyisocyanate resin being separated as a bottom product (starting run: example 3-0).

The distillate containing the active catalyst was collected in a second stirring apparatus with flat-ground joints, whose construction is identical to that of the first, and immediately after the end of distillation was made up with freshly degassed HDI to 540 ml. Subsequently, stirring was carried out again for the time indicated in Table 5, at 40° C., and the product was worked up by distillation as described above (example 3-A) and then made up to 500 ml with freshly degassed HDI. This procedure was repeated a further two times (to experiment 3-C).

TABLE 5

| Ex. 3- | Reaction time [hh:mm] | Resin yield [g] | NCO content [%] | Viscosity at 23° C. [mPas] | Ureton-imines [mol %] | Uret-diones [mol %] | Iso-cyan-urates [mol %] | Iminooxa-diazin-diones [mol %] |
|---|---|---|---|---|---|---|---|---|
| 0 | 15:02 | 107 | 23.1 | 1130 | 0.2 | 8.2 | 65.4 | 26.2 |
| A | 25:25 | 164 | 22.6 | 1530 | 0.3 | 9.1 | 65.2 | 25.4 |
| B | 22:57 | 146 | 22.5 | 1480 | 0.3 | 8.7 | 65.3 | 25.7 |
| C | 22:48 | 106 | 20.8 | 1760 | 0.8 | 6.8 | 66.1 | 26.3 |

Example 4

Catalyst: Cyclopentylphobane, Isomer Mixture IV 20 g (0.12 mol) of freshly distilled HDI were stirred at 60° C. first under reduced pressure (0.1 mbar) in order to remove dissolved gases for 1 h, then blanketed with dry nitrogen and admixed at 60° C. with 0.25 g (1.2 mmol) of cyclopenthylphobane, isomer mixture. The rise in the refractive index, as a measure of the progressing reaction, was monitored (Tab. 6).

TABLE 6

| Reaction time hh:mm | $n_D^{20}$ |
|---|---|
| 0:00 | 1.4531 |
| 1:00 | 1.4540 |
| 2:00 | 1.4547 |
| 3:00 | 1.4555 |
| 4:00 | 1.4562 |
| 5:00 | 1.4569 |
| 22:48 | 1.4690 |
| 29:03 | 1.4724 |
| 96:00 | 1.4985 |

The samples obtained after a reaction time of 3 hours and of 5 hours were analysed: cf. Table 7.

TABLE 7

| Ex. | $n_D^{20}$ | Uretonimines [mol %] | Uretdiones [mol %] | Iso-cyanurates [mol %] | Iminooxa-diazinediones [mol %] |
|---|---|---|---|---|---|
| 4-1 | 1.4555 | n.d. | 7.0 | 57.1 | 35.9 |
| 4-2 | 1.4569 | n.d. | 6.4 | 59.5 | 34.1 |

Example 5

Catalyst: Eicosylphobane, Isomer Mixture V 20 g (0.12 mol) of freshly distilled HDI were stirred at 60° C. first under reduced pressure (0.1 mbar) in order to remove dissolved gases for 1 h, then blanketed with dry nitrogen and admixed at 70° C. with 0.13 g (0.31 mmol) of eicosylphobane, isomer mixture. The rise in the refractive index, as a measure of the progressing reaction, was monitored (Tab. 8).

TABLE 8

| Reaction time hh:mm | $n_D^{20}$ |
|---|---|
| 0:10 | 1.4523 |
| 1:00 | 1.4560 |
| 2:00 | 1.4600 |
| 3:00 | 1.4638 |
| 4:00 | 1.4673 |
| 5:20 | 1.4716 |

The reaction mixture obtained after a reaction time of 5 hours and 20 minutes was analysed (Table 9).

TABLE 9

| Ex. | $n_D^{20}$ | Uretonimines [mol %] | Uretdiones [mol %] | Iso-cyanurates [mol %] | Iminooxa-diazinediones [mol %] |
|---|---|---|---|---|---|
| 5 | 1.4716 | 1.1 | 17.6 | 56.0 | 25.3 |

Comparative Examples 1 to 4

Catalysis with Open-Chain Trialkylphosphines (not Inventive)

In each case 200 g (1.19 mol) of freshly distilled HDI were stirred at 60° C. under reduced pressure (0.1 mbar) to start with in order to remove dissolved gases for 1 h, then blanketed with dry nitrogen and admixed at:
Comparative examples 1) and 2) 60° C.
Comparative example 2) 120° C. and
Comparative Example 3) 180° C.
with in each case 0.75 g (3.7 mmol) of tri-n-butylphosphine (TBP, Cytec) and the resulting mixtures were reacted under a nitrogen atmosphere until the refractive index of the crude solution as indicated in Tab. 10 was reached. Subsequently, by addition of in each case 4 g (26 mmol) of methyl p-toluenesulphonate and subsequent stirring at 80° C. for an hour, ongoing reaction was reliably prevented ('stopped'), as evident from the fact that there was no longer any change in the refractive index of the mixture (cf. Tab. 10, $n_D^{20}$ (stop)).

The crude products were subsequently freed from the unreacted monomer by thin-film distillation at 120° C./0.1 mbar in a short-path evaporator. Subsequently the product composition was determined by NMR spectroscopy; cf. Table 10.

TABLE 10

Results of tributylphosphine-catalysed HDI oligomerization at different temperatures (oxadiazinetriones not taken into account)

| Comp. ex. | $n_D^{20}$ (stop) | Resin yield [%] | Viscosity [mPas] | Residual monomer content [%] | Uretonimines [mol %] | Uretdiones [mol %] | Isocyanurates [mol %] | Iminooxadiazindiones [mol %] |
|---|---|---|---|---|---|---|---|---|
| 1 | 1.4732 | 46.3 | 240 | 0.1 | n.d.[1] | 69 | 22 | 9 |
| 2 | 1.4809 | 70.4 | 880 | 0.2 | 1 | 44 | 39 | 16 |
| 3 | 1.4714 | 47.0 | 1350 | 0.8 | 40 | 32 | 20 | 8 |
| 4 | 1.4768 | 39.4 | 5200[2] | 2.7 | 54 | 4 | 30 | 12 |

[1]n.d. = not detectable,
[2]heterogeneous, turbid product

Example 5

Catalysis with Open-Chain Trialkylphosphines, Mixture of Aliphatic and Aromatic Diisocyanate (not Inventive)

A mixture of 260 g (1.5 mol) of freshly distilled HDI and 130 g (0.75 mol) of freshly distilled TDI (mixture of the 2,4 and 2,6 isomers in a ratio of 4:1) was stirred at 60° C. initially under reduced pressure (0.1 mbar) for the removal of dissolved gases for 1 h, then blanketed with dry nitrogen and admixed at 60° C. with 80 mg (0.4 mmol) of TBP. After the refractive index of the crude solution as specified in Tab. 11 had been reached, ongoing reaction was reliably prevented ('stopped'), as evident from the fact that there was no longer any change in the refractive index of the mixture (cf. Tab. 11, $n_D^{20}$ (stop) by addition of 15 mg (0.47 mmol) of elemental sulphur and subsequent stirring at 60° C. for an hour and the mixture was analysed.

TABLE 11

Result of tributylphosphine-catalysed HDI-TDI mixed oligomerization

| Comp. ex. | $n_D^{20}$ (stop) | Uretonimines [mol %] | Uretdiones [mol %] | Isocyanurates [mol %] | Iminooxadiazindiones [mol %] |
|---|---|---|---|---|---|
| 5 | 1.5138 | n.d. | 15 | 85 | n.d. |

[1] n.d. = not detectable

Comparative Examples 6 to 9

Catalysis with Partially Aromatically Substituted and Also with Sterically Hindered Trivalent Phosphorus Compounds (not Inventive)

In each case 100 g of HDI were degassed at 30° C. for an hour with stirring under reduced pressure (0.5 mbar), blanketed with nitrogen and then admixed with stirring initially with in each case 0.1 mol % (based on initial HDI introduced) of the following phosphorus compounds:

6) dimethylphenylphosphine,
7) 1-phenyl-3-methylphosphol-3-ene 8) tri(tert-butyl)phosphine and
9) tri(isopropyl)phosphine.

Since there was no significant increase in the refractive index of the reaction mixture over the course of 8 hours in any of the cases, a further 0.1 mol % (based on initial HDI introduced) of the respective phosphorus compound used was then added at the same temperature and stirring was continued for 8 hours more. In no case did the refractive index of the reaction mixture increase to more than 1.4530, a fact which demonstrates negligible activity of the described phosphorus compounds in respect of an isocyanate oligomerization reaction.

The invention claimed is:

1. A process for preparing polyisocyanates from aliphatic and/or cycloaliphatic isocyanates, wherein the fraction of isocyanurate structures and iminooxadiazinedione structures in the polyisocyanate formed is more than 60 mol %, the fraction of uretdione structures is less than 25 mol %, and the fraction of carbodiimide structures and uretonimine structures is less than 5 mol %, based on the sum of all the types of structure formed, comprising reacting at least one aliphatic and/or cycloaliphatic isocyanate in the presence of a heterocyclic catalyst of formula (I)

wherein $R^1$ is a non-cyclic or cyclic aliphatic $C_1$-$C_{50}$ radical; and $R^2$ and $R^3$ together with the phosphorus atom, and optionally with $R^1$, define a cycloaliphatic $C_2$-$C_{20}$ radical.

2. The process of claim 1, wherein in formula (I)

$R^1$ is a non-cyclic or cyclic, aliphatic $C_1$-$C_{12}$ radical; and $R^2$ and $R^3$ together with the phosphorus atom define a saturated cycloaliphatic $C_4$-$C_6$ radical.

3. The process of claim 1, wherein said catalyst of formula (I) is selected from the group consisting of 1-methyl-1-phospholane, 1-ethyl-1-phospholane, 1-propyl-1-phospholane, 1-butyl-1-phospholane, 1-pentyl-1-phospholane, 1-hexyl-1- phospholane, 1-octyl-1-phospholane, 9-methyl-9-phosphabicyclononane, 9-ethyl-9-phosphabicyclononane, 9-propyl-9-phosphabicyclononane, 9-butyl-9-phosphabicyclononane, 9-pentyl-9-phosphabicyclononane, 9-hexyl-9-phosphabicyclononane, 9-octyl-9-phosphabicyclononane, 9-dodecyl-9-phosphabicyclononane, 9-eicosyl-9-phosphabicyclononane, and mixtures thereof.

4. The process of claim 1, wherein said at least one aliphatic and/or cycloaliphatic isocyanate is reacted in the presence of the heterocyclic catalyst of formula (I) at a temperature in the range of from 0 to 150° C.

5. The process of claim 1, wherein said at least one aliphatic and/or cycloaliphatic isocyanate is reacted in the presence of the heterocyclic catalyst of formula (I) under an inert gas atmosphere.

* * * * *